W. H. CONE.
MOTION PICTURE PROJECTOR.
APPLICATION FILED JAN. 8, 1918.
1,356,600.
Patented Oct. 26, 1920.
3 SHEETS—SHEET 1.
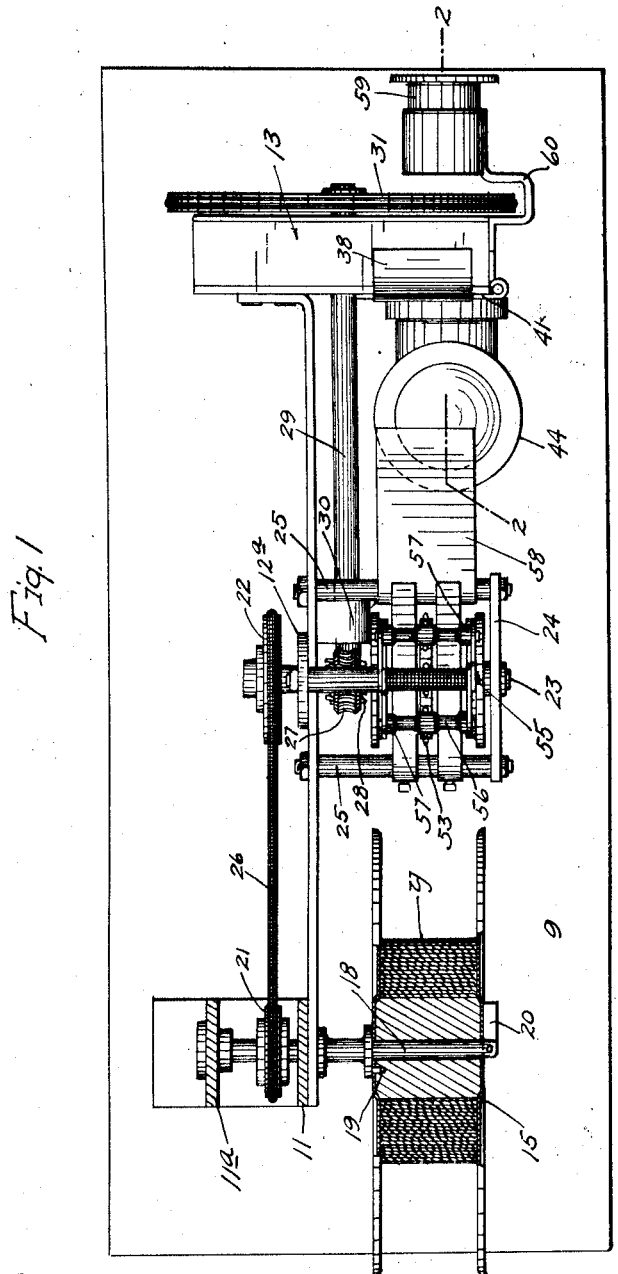
WITNESSES
E. C. Wells
H. L. Opsahl.
INVENTOR
William H. Cone
BY HIS ATTORNEYS
Williamson Merchant

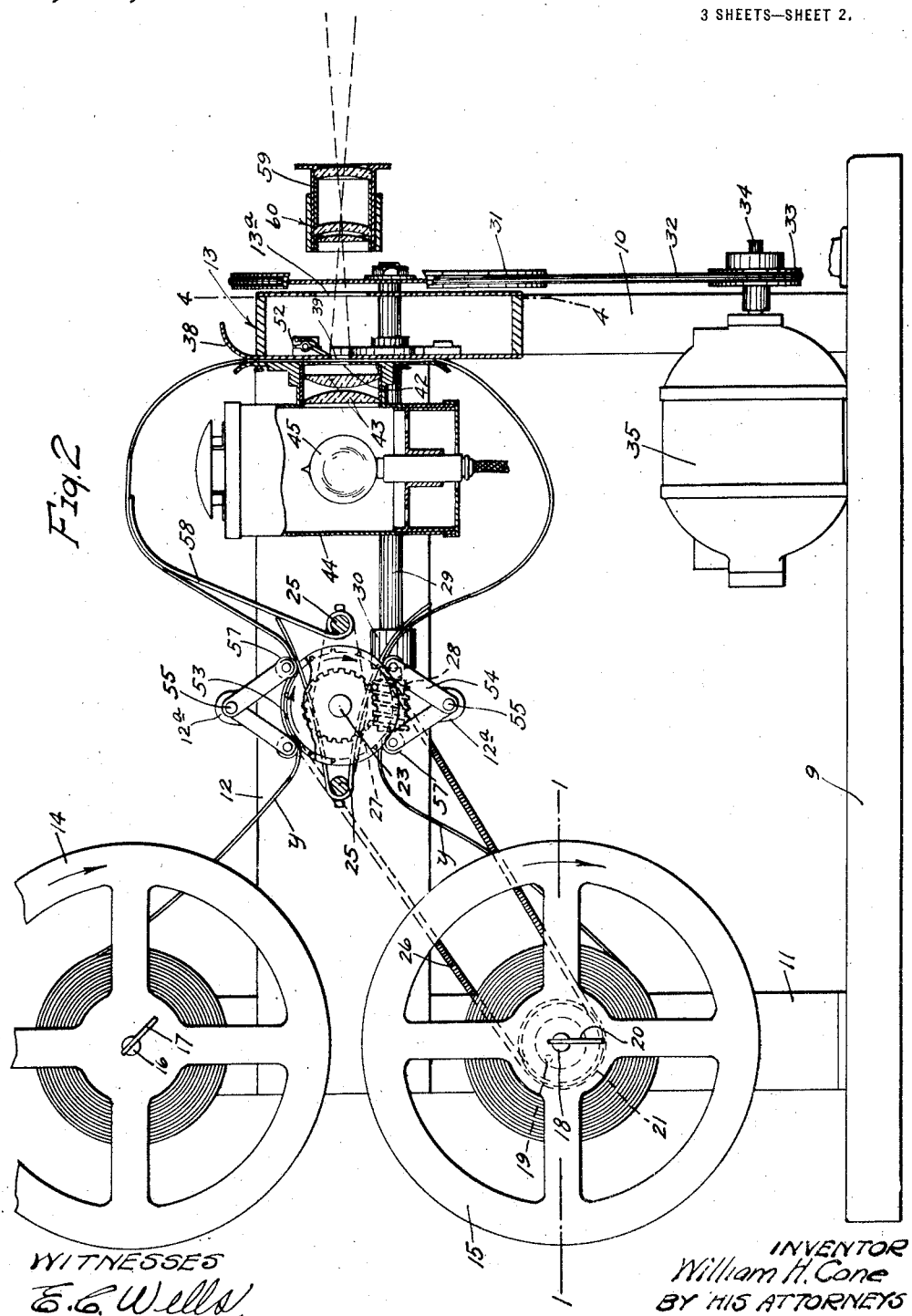

W. H. CONE.
MOTION PICTURE PROJECTOR.
APPLICATION FILED JAN. 8, 1918.
1,356,600.
Patented Oct. 26, 1920.
3 SHEETS—SHEET 3.
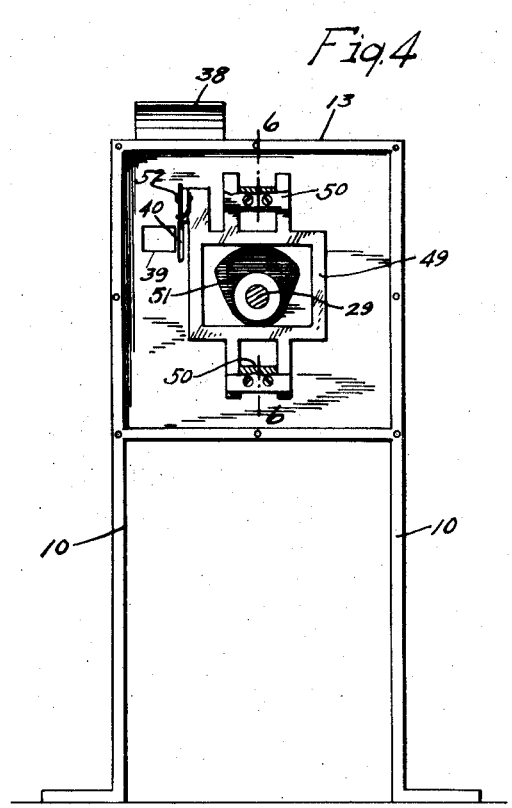
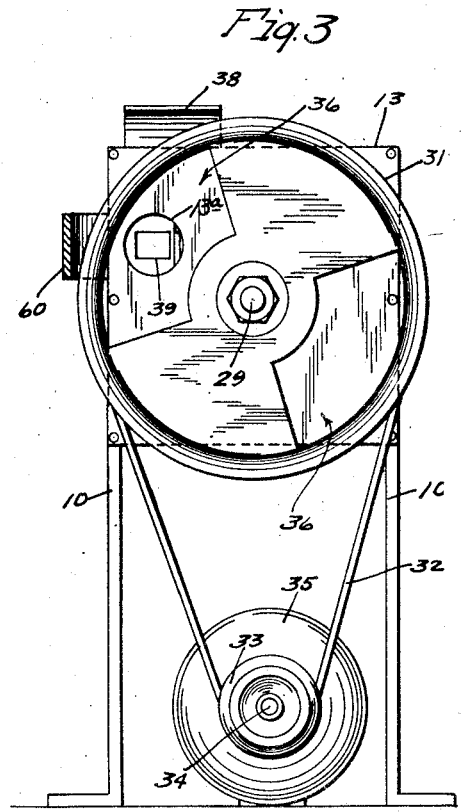
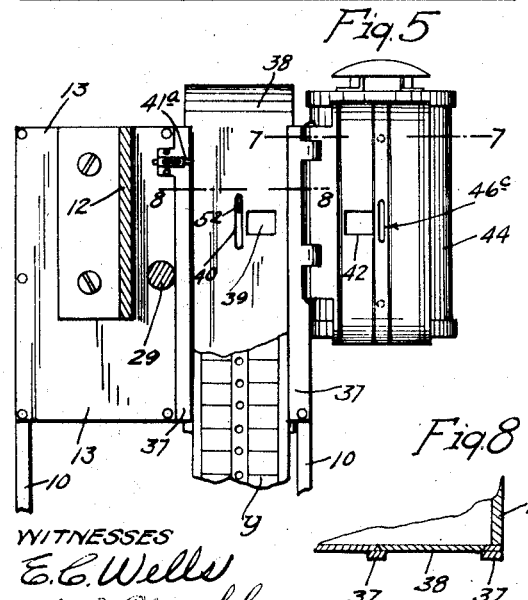
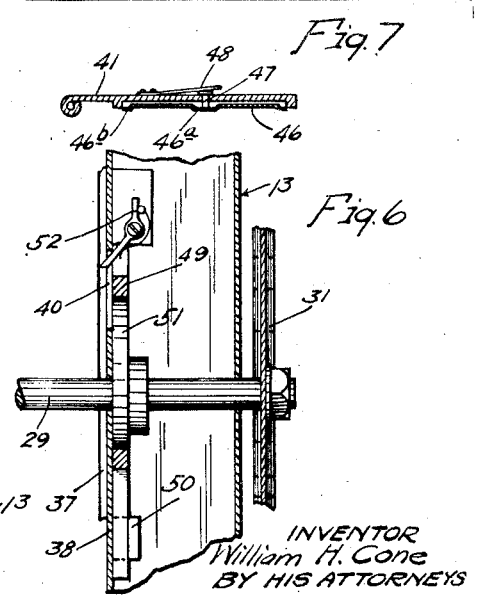
WITNESSES
E. C. Wells
H. L. Opsahl.
INVENTOR
William H. Cone
BY HIS ATTORNEYS

UNITED STATES PATENT OFFICE.

WILLIAM H. CONE, OF MINNEAPOLIS, MINNESOTA, ASSIGNOR OF ONE-HALF TO CHESTER H. CARPENTER, OF MINNEAPOLIS, MINNESOTA.

MOTION-PICTURE PROJECTOR.

1,356,600.              Specification of Letters Patent.    Patented Oct. 26, 1920.

Application filed January 8, 1918. Serial No. 210,820.

*To all whom it may concern:*

Be it known that I, WILLIAM H. CONE, a citizen of the United States, residing at Minneapolis, in the county of Hennepin and State of Minnesota, have invented certain new and useful Improvements in Motion-Picture Projectors; and I do hereby declare the following to be a full, clear, and exact description of the invention, such as will enable others skilled in the art to which it appertains to make and use the same.

My present invention has for its object to provide an extremely simple and highly efficient motion picture projector; and to such ends, generally stated, the invention consists of the novel devices and combinations of devices hereinafter described and defined in the claims.

Especially, the present machine is designed for the projection of pictures from multiple row filaments.

The machine is, nevertheless, capable of use in handling the ordinary films. In its use in connection with the multiple row films, it is particularly adapted to be made in small sizes and at comparatively small cost for use in various places where high-priced machines would not be purchased, such, for example, as for school use, home use, illustration of travalogues or other lectures, for advertising purposes, and the like.

In the accompanying drawings which illustrate the invention, like characters indicate like parts throughout the several views.

Referring to the drawings:

Figure 1 is a plan view of the machine with some parts sectioned on the line 1—1 of Fig. 2;

Fig. 2 is a side elevation of the machine with some parts sectioned on the line 2—2 of Fig. 1;

Fig. 3 is a front elevation of the machine with the lens mount and its lenses removed from working position;

Fig. 4 is a transverse vertical section taken on the line 4—4 of Fig. 2;

Fig. 5 is a rear face view of the operator plate and with the gate turned into an open position;

Fig. 6 is an enlarged vertical section on the line 5—5 of Fig. 4, some parts being left in full;

Fig. 7 is a horizontal section taken through the gate on the line 7—7 of Fig. 5; and Fig. 8 is a detail in section taken approximately on the line 8—8 of Fig. 5.

The framework of the machine, as shown, is made up of a base 9, two front legs 10, a rear leg 11 and a horizontally extended supporting plate or bar 12 that is set edgewise in a vertical position and supported by the rear leg 11 and one of the front legs 10. The front legs 10, at their upper end portions, support a box-like structure 13 that constitutes a housing for the intermediate devices.

The film *y*, which, as already indicated, is advisably of the multi-row type disclosed and broadly claimed in my companion application above identified, is fed from an upper reel 14 and a common lower reel 15. The upper reel 14 is detachably mounted on a supporting stud 16 that is rigidly secured to the upper end of the leg 11. A pivoted reel retaining finger 17, which is turned into alinement with the stud, is adapted to pass through the reel.

The lower reel 15 is detachably applied on the end of a driven spindle 18 that is journaled in the leg 11 and in an offset portion thereof. Adjacent to the inner face of the reel 15, the spindle 18 has an annular flange equipped with an eccentric driving pin 19 that acts as a dowel pin and fits a seat in the adjacent face of said reel, so that the latter is caused to rotate with the said spindle. At its outer end, the spindle 18 has a pivoted reel retaining finger 20, which, when turned into alinement with the spindle, is adapted to be passed through the reel. The spindle 19 is provided with a grooved pulley or sheave 21 that is alined with a larger grooved sheave or pulley 22 secured on one end of a shaft 23 that is journaled in the plate 12 and in an offset supplemental plate 24, which latter is rigidly secured to said plate 12 by spacing studs 25 (see particularly Figs. 1 and 2). A belt preferably in the form of an endless coiled spring 26 runs over the pulley 21 and 22 and operates as hereinafter more fully noted.

At its intermediate portion, the shaft 23 carries a worm gear 27 that meshes with a worm 28 secured on the rear end of a horizontal forwardly extended shaft 29 that is journaled at its rear portion in a bearing 30 on the plate 12 and is journaled at its front end in the front and rear plates of the housing 13 (see particularly Fig. 6).

Secured to the extreme front end of the shaft 29 is a large grooved pulley or sheave 31 which serves three purposes, towit, that of a driving pulley or wheel, of a fly wheel, and of a shutter. To carry out the first function of the said wheel, a driving belt 32 is run over the same and over a smaller grooved pulley 33, which is carried by the armature shaft 34 of an electric motor 35 shown as supported on the base 9.

To carry out the second function of the said wheel 31, it is formed with a heavy rim portion; and to carry out the third function towit, that of a shutter, it is formed with a thin web having diametrically opposite light openings 36. Each opening 36 preferably extends through ninety degrees and each solid web portion between the same, also, preferably extends through ninety degrees. This evenly divides the time interval of a complete cycle between the light and dark intervals; and, as will presently appear, it gives two evenly divided light and two dark intervals for each exposure of the film.

The back plate of the housing 13 is cut away at one side and provided with laterally spaced grooved guide strips 37 that hold a vertically movable aperture plate in the form of a slide 38. This aperture plate is made frictionally held in its guides but is made vertically adjustable to permit a "framing" and it is formed with a light aperture 39 and with a vertical clearance slot 40.

It will be noted that the light aperture 39 is at one side of the transverse center of the channel formed between the guide strips 37, so that it will be alined with but one row of images on the negative. The negative is fed between the said guide strips 37 and is held in close engagement with the aperture plate 38, by a gate mechanism best shown in Figs. 2, 5 and 7.

The gate 41 is hinged to lugs on the outer guide strip 37 and it is provided with a light aperture 42 that normally alines with the light aperture 39. Surrounding the light aperture 42, the gate is provided with a rearwardly projected hub that detachably supports the condensing lenses 43 and the lamp house 44, in which latter is the customary electric lamp 45. A suitable latch 41ª (see Fig. 5) serves to normally hold the gate in a closed position.

For engagement with the film, the inner face of the gate 41 is provided with a presser plate 46 (see particularly Figs. 5 and 7), which is secured to short centrally located plunger pins 47 that work through the gate and are laterally pressed by springs 48 secured to the back of the gate. This presser plate 46 has a central film engaging ridge 46ª and edge film engaging ridge 46ᵇ. The images on the double row film y will pass between the ridges 46ª and 46ᵇ, and hence, will not be frictionally engaged by the presser plate. The central portion of the film, however, will be closely held against the aperture plate 48 by the central ridge 46ª. The ridge 46ª, at its central portion, is provided with a slot 46ᶜ (see Fig. 5), which, when the gate is closed, alines with the slot 40 of the aperture plate 38 for the purpose which will presently appear.

For imparting the intermittent or start and stop movement to the film, and for properly positioning the same during the exposure intervals of the light aperture 39, I provide a reciprocating feed mechanism, preferably comprising, as follows (see Figs. 2, 4, 5 and 6):

The numeral 49 indicates a rectangular shutter frame which has upwardly and downwardly projected parallel prongs that straddle upper and lower guide blocks 50 rigidly secured to the inner face of the rear plate of the housing 13. The shutter frame 49 is thus guided for true vertical movements. It is given its intermittent movements by a cam 51 that engages the rectangular frame thereof, and is secured to, and carried by the shaft 29. Under the action of the cam 51, the shutter frame 49 will be held stationary while the concentric portions of the cam 51 are operating on the same and the said frame will be given its to and fro movements at intervals between its times of rest.

The shutter frame 49 (see particularly Figs. 4 and 6) is provided with a laterally spring-pressed feed dog 52 that works through the slot 40 of the aperture plate 38, is adapted to engage with the central row of perforations $y^1$ of the film y and is adapted to project slightly into the clearance slot 46ᶜ of the presser plate 46. Obviously, in view of the oblique arrangement of the feed dog 52 (see Fig. 6), the said dog, under upward movement, will cam itself out of engagement with the perforations $y^1$ of the film, but under downward movement, will positively engage the said perforations and positively feed the film downward a distance corresponding to the spacing of the images on the film. Of course, the arrangement is such that the successive images of the film will be positioned, one after the other, in line with the light aperture 39 of the aperture plate. By vertical adjustment of the aperture plate 38, the images may be properly "framed" on the screen.

The constant movement of the film from the upper to the lower reel is accomplished by a single feed sprocket 53, the teeth of which engage the central row of sprocket holes of the film y. This feed sprocket 53 is secured on the heretofore noted shaft 23 so that it is driven in synchronism with the worm gear 27. The upper portion of the film is held in running engagement with the upper portion of the sprocket wheel 53, and the lower portion of the film is held in working engagement with the lower portion of said sprocket wheel by spring pressed arms 54 pivoted to studs 55 secured to lugs 12ª of the supporting bar 12. These arms 54 are arranged in pairs, and at their free ends, they carry spindles 56 that are provided with small film engaging rollers 57 (see Figs. 1 and 2). That portion of the film that passes over the lamp house is guided by a plate 58 shown as secured to one of the studs 25.

The numeral 59 indicates a lens and lens mounting located in front of the shutter, and supported from the housing 13 by a bracket 60. The lens 59 is of well known construction and is in axial alinement with the light apertures 39 and 40 and lenses 43 of the electric lamp 45 which latter is located in the lamp house 44. Also note that light aperture 39 is alined with the light aperture 13ª of the housing 13.

In feeding the film through the projecting machine described one side or row of its images are moved past the light aperture while the film is being fed from the upper to the lower reel; and then the other side will be likewise fed past the light aperture by interchanging the reels, that is, by placing the full lower reel on the upper spindle and the empty upper reel on the lower spindle.

What I claim is:

1. In a motion picture projector, the combination with a light house and condensing lens, of an aperture plate located in front of said lens and having a light aperture alined with said lens, a gate coöperating with said aperture plate and having a yielding presser plate engageable with the back of the film, a rotary power driven shaft extending through said aperture plate, a cam secured to said shaft immediately adjacent the front face of said aperture plate, a shutter carried by the front end of said shaft, a shuttle-acting frame subject to said cam and mounted to reciprocate parallel to the line of movement of the film, and a feed dog carried by said shuttle-acting frame and operative on perforations of the film to impart intermittent movement to the film.

2. In a motion picture projector, the combination with a light house and condensing lens, of an aperture plate located in front of said lens and having a light aperture alined with said lens, a gate coöperating with said aperture plate and having a yielding presser plate engageable with the back of the film, a rotary power driven shaft extending through said aperture plate, a cam secured to said shaft immediately adjacent the front face of said aperture plate, a shutter carried by the front end of said shaft, a shuttle-acting frame subject to said cam and mounted to reciprocate parallel to the line of movement of the film, a feed dog carried by said shuttle-acting frame and operative on perforations of the film to impart intermittent movement to the film, a worm carried by the rear end of said shaft, a worm gear meshing with said worm, a sprocket wheel rotatable with said worm gear, and means for holding the upper and lower portions of the film engaged, respectively with the upper and lower portions of said sprocket wheel to impart a constant movement to said film.

In testimony whereof I affix my signature in presence of two witnesses.

WILLIAM H. CONE,

Witnesses:
CLARA DEMAREST,
BERNICE G. BAUMANN.